United States Patent
Sforzin et al.

(10) Patent No.: US 12,541,428 B2
(45) Date of Patent: Feb. 3, 2026

(54) APPARATUSES AND METHODS FOR DISTRIBUTING AND PROVIDING DATA PROTECTION FOR AUXILIARY DATA

(71) Applicant: Micron Technology, Inc., Boise, ID (US)

(72) Inventors: Marco Sforzin, Cernusco sul Naviglio (IT); Daniele Balluchi, Cernusco sul Naviglio (IT)

(73) Assignee: Micron Technology, Inc., Boise, ID (US)

( * ) Notice: Subject to any disclaimer, the term of this patent is extended or adjusted under 35 U.S.C. 154(b) by 7 days.

(21) Appl. No.: 18/787,949

(22) Filed: Jul. 29, 2024

(65) Prior Publication Data

US 2026/0030102 A1    Jan. 29, 2026

(51) Int. Cl.
*G06F 11/10* (2006.01)

(52) U.S. Cl.
CPC ...... *G06F 11/1068* (2013.01); *G06F 11/1004* (2013.01)

(58) Field of Classification Search
CPC .......................... G06F 11/1068; G06F 11/1004
See application file for complete search history.

(56) References Cited

U.S. PATENT DOCUMENTS

| | | | |
|---|---|---|---|
| 7,558,326 B1 * | 7/2009 | Lyle ........................ | H04L 1/203 348/478 |
| 10,073,731 B2 * | 9/2018 | Motwani .................. | G06F 11/10 |
| 10,268,541 B2 * | 4/2019 | Niu ........................ | G11C 29/52 |
| 10,762,010 B2 * | 9/2020 | Ware .................... | G06F 13/1678 |
| 11,907,061 B2 * | 2/2024 | Schaefer ............... | H04L 1/0041 |
| 11,960,776 B2 | 4/2024 | Sforzin et al. | |
| 12,326,781 B2 * | 6/2025 | Jannusch ............ | G06F 11/1044 |
| 2012/0254684 A1 * | 10/2012 | Loghin ..................... | H04L 1/02 714/752 |
| 2018/0046541 A1 * | 2/2018 | Niu ..................... | G06F 11/1048 |
| 2018/0137067 A1 * | 5/2018 | Ware ................... | G06F 13/1673 |
| 2023/0393939 A1 | 12/2023 | Balluchi | |

OTHER PUBLICATIONS

R. Maddah, R. Melhem and S. Cho, "RDIS: Tolerating Many Stuck-At Faults in Resistive Memory," in IEEE Transactions on Computers, vol. 64, No. 3, pp. 847-861, Mar. 2015, (Year: 2015).*
Smruti Subhash Jhaveri, et al., U.S. Appl. No. 18/651,357, filed Apr. 30, 2024, entitled, "Sequential Access to Linked Memory Dice for Bus Training", 38 pages.

* cited by examiner

*Primary Examiner* — Daniel F. McMahon
(74) *Attorney, Agent, or Firm* — Brooks, Cameron & Huebsch, PLLC

(57) ABSTRACT

Some rows of memory cells can be configured to store auxiliary data, which provides data protection for user data stored in the other rows of memory cells. The data protection provided by the auxiliary data can include, but not limited to, error correction and/or detection schemes. To further enhance the protection of data stored in the rows of memory cells, the available space in these rows of memory cells can be used to store preliminary auxiliary data, designed to provide data protection for the auxiliary data itself.

20 Claims, 8 Drawing Sheets

FIG. 3

| | 332-1 | 332-2 | 332-3 | 332-4 | 332-5 | 332-6 | 332-7 | 332-8 | 332-9 | 332-10 | 332-11 | 332-12 | 332-13 | 332-14 | 332-15 | 332-16 |
|---|---|---|---|---|---|---|---|---|---|---|---|---|---|---|---|---|
| BL32 | 0 | 1 | 2 | 3 | 4 | 5 | 6 | 7 | 8 | 9 | 10 | 11 | 12 | 13 | 14 | 15 |
| BL16 (CS) | 0 1 | 2 3 | 4 5 | 6 7 | 8 9 | 10 11 | 12 13 | 14 15 | 16 17 | 18 19 | 20 21 | 22 23 | 24 25 | 26 27 | 28 29 | 30 31 |
| 327-1 → Die1 DQ | 32B | 32B | 32B | 32B | 32B | 32B | 32B | 32B | 32B | 32B | 32B | 32B | 32B | 32B | 32B | 32B |
| DMI | 2B | 2B | 2B | 2B | 2B | 2B | 2B | 2B | 2B | 2B | 2B | 2B | 2B | 2B | 2B | 2B |
| 327-2 → Die2 DQ | 32B | 32B | 32B | 32B | 32B | 32B | 32B | 32B | 32B | 32B | 32B | 32B | 32B | 32B | 32B | 32B |
| DMI | 2B | 2B | 2B | 2B | 2B | 2B | 2B | 2B | 2B | 2B | 2B | 2B | 2B | 2B | 2B | 2B |

| 332-17 | 332-18 | 332-19 | 332-20 | 332-21 | 332-22 | 332-23 | 332-24 | 332-25 | 332-26 | 332-27 | 332-28 | 332-29 | 332-30 | 332-31 | 332-32 ← 332 |
|---|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 | 31 ← 334 |
| 34 35 | 2 3 | 4 5 | 6 7 | 8 9 | 10 11 | 12 13 | 14 15 | 16 17 | 18 19 | 20 21 | 22 23 | 24 25 | 26 27 | 28 29 | 30 31 |
| 32B | 32B | 32B | 32B | 32B | 32B | 32B | 32B | 32B | 32B | 32B | 32B | 32B | 32B | 32B | 32B ← 336-1 |
| 2B | 2B | 2B | 2B | 2B | 2B | 2B | 2B | 2B | 2B | 2B | 2B | 2B | 2B | 2B | 2B ← 338-1 |
| 32B | 32B | 32B | 32B | 32B | 32B | 32B | 32B | 32B | 32B | 32B | 32B | 32B | 32B | 32B | 32B ← 336-2 |
| 2B | 2B | 2B | 2B | 2B | 2B | 2B | 2B | 2B | 2B | 2B | 2B | 2B | 2B | 2B | 2B ← 338-2 |

32B4: 12 entries _564_

32B2: 20 entries _566_

Spare: 16 _573_

31: 190138 _572_

31A: 173748 _576_

31B: 16390 _578_

32: 6454 _574_

32A: 5429 _580_

32B: 1024 _582_

32AB: 1 _583_

32B4: 12 entries _584_

32B2: 20 entries _586_

APPARATUSES AND METHODS FOR DISTRIBUTING AND PROVIDING DATA PROTECTION FOR AUXILIARY DATA

TECHNICAL FIELD

The present disclosure relates generally to semiconductor memory and methods, and more particularly, to apparatuses, systems, and methods related to distributing and providing data protection for auxiliary data.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

BRIEF DESCRIPTION OF THE DRAWINGS

FIG. 3 illustrates a virtual representation of data alignment and transfer corresponding to a channel in accordance with a number of embodiments of the present disclosure.

FIG. 5A schematically illustrates example memory partitioning of one or more memory dice in accordance with a number of embodiments of the present disclosure.

FIG. 5B schematically illustrates another example memory partitioning of one or more memory dice in accordance with a number of embodiments of the present disclosure.

DETAILED DESCRIPTION

Figure 1:
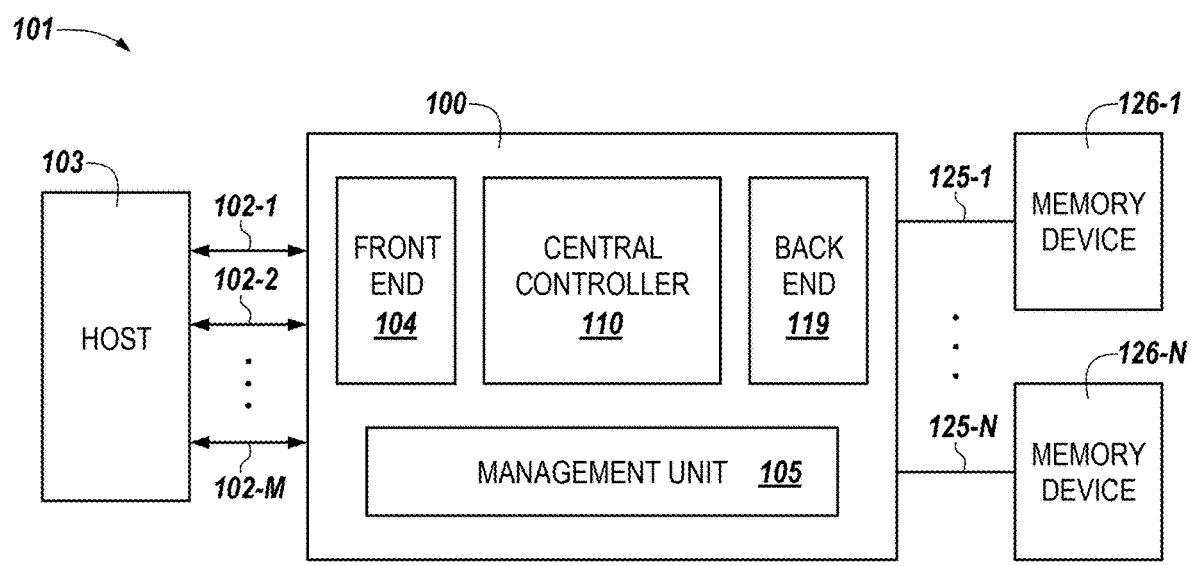
FIG. 1 is a functional block diagram of a computing system including a memory controller in accordance with a number of embodiments of the present disclosure.

Systems, apparatuses, and methods related to distributing and providing data protection for auxiliary data are described. Data received from hosts (referred to as "host data" or "user data") can be stored in memory media (e.g., memory banks, dice, etc.). Often, extra data (e.g., not received from the host) is generated based on the user data to ensure the quality of the user data. For example, the extra data can provide data protection, integrity, and consistency of the user data. As an example, the extra data can include parity bits used to correct bit errors in the user data. This generated extra data is stored along with the user data in the memory media.

Often, the larger the size of the extra data, the more it can enhance the quality. For example, a greater quantity of parity bits per a certain amount of user data bits can improve error correction and detection capabilities for the user data. However, accessing the extra data along with the user data may often degrade system performance, such as by increasing latencies. For instance, if a single memory access is predefined as retrieving a certain quantity of bits, accessing a larger amount of extra data alongside the user data may increase the number of memory accesses needed. This happens even when the total quantity of bits to be accessed is significantly less than the quantity of bits corresponding to the increased number of accesses. More specifically, if a single memory access is defined as 64 bytes, accessing 64 bytes of user data in one access may be followed by a "second access" to retrieve just a few bytes of extra data, even though the remaining bits that may be irrelevant to the user and retrieved in the second access far exceed the few bytes of extra data needed.

Aspects of the present disclosure address the above and other challenges by providing data distribution schemes that minimize the frequency of and/or size of a "second access" when accessing one or multiple data blocks of user data. In embodiments of the present disclosure, the reduced quantity of or size of a "second access" allows for additional space to enhance data protection against errors. For example, the freed-up space can be configured to store secondary extra data to correct and/or detect errors in extra data designed to correct and/or detect errors in user data with very limited performance cost.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. It is to be understood that data can be transferred, read, transmitted, received, or exchanged by electronic signals (e.g., current, voltage, etc.).

The figures herein follow a numbering convention in which the first digit or digits correspond to the drawing figure number and the remaining digits identify an element or component in the drawing. Similar elements or components between different figures may be identified by the use of similar digits. For example, 126 may reference element "26" in FIG. 1, and a similar element may be referenced as 226 in FIG. 2. Analogous elements within a Figure may be referenced with a hyphen and extra numeral or letter. See, for example, elements 102-1, 102-2, 102-M in FIG. 1. Such analogous elements may be generally referenced without the hyphen and extra numeral or letter. For example, elements 102-1, 102-2, 102-M may be collectively referenced as elements 102. As used herein, the designators "M" and "N", particularly with respect to reference numerals in the drawings, indicate that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a functional block diagram of a computing system 101 (alternatively referred to as "memory system") including a memory controller 100 in accordance with a number of embodiments of the present disclosure. The memory controller 100 can include a front end portion 104, a central controller portion 110, and a back end portion 119. The computing system 101 can include a host 103 and memory devices 126-1, . . . , 126-N coupled to the memory controller 100.

The front end portion 104 includes an interface and interface management circuitry to couple the memory controller 100 to the host 103 through input/output (I/O) lanes 102-1, 102-2, . . . , 102-M and circuitry to manage the I/O lanes 102. There can be any quantity of I/O lanes 102, such as eight, sixteen, or another quantity of I/O lanes 102. In some embodiments, the I/O lanes 102 can be configured as a single port.

In some embodiments, the memory controller 100 can be a compute express link (CXL) compliant memory controller. The host interface (e.g., the front end portion 104) can be managed with CXL protocols and be coupled to the host 103 via an interface configured for a peripheral component interconnect express (PCIe) protocol. CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface. As an example, the interface of the front end 104 can be a PCIe 5.0 or 6.0 interface coupled to the I/O lanes 102. In some embodiments, the memory controller 100 can receive access requests involving the memory device 126 via the PCIe 5.0 or 6.0 interface according to a CXL protocol.

The central controller portion 110 can include and/or be referred to as data management circuitry. The central controller portion 110 can control, in response to receiving a request from the host 103, performance of a memory operation. Examples of the memory operation include a read operation to read data from a memory device 126 or a write operation to write data to a memory device 126.

The central controller portion 110 can generate "auxiliary data" to provide data protection scheme on data received from the host 103 and/or other auxiliary data generated at the central controller portion 110. As used herein, the term "auxiliary data" refers to data generated at the memory controller 100 (e.g., the central controller portion 110) and that may not correspond to data received from the host 103. Although embodiments are not so limited, example auxiliary data can include error correction information (alternatively referred to as error correction data), error detection information (alternatively referred to as error detection data), etc.

An example of an error detection operation that can be performed using error detection information is a cyclic redundancy check (CRC) operation. CRC may be referred to as algebraic error detection. CRC can include the use of a check value resulting from an algebraic calculation using the data to be protected. CRC can detect accidental changes to data by comparing a check value stored in association with the data to the check value calculated based on the data.

An error correction operation (alternatively referred to as error correction code (ECC) operation) performed using the error correction information can correct an amount of bit errors and/or detect an amount of bit errors that may have not been corrected using the ECC operation. Error correction information used to perform the ECC operation can be parity data (alternatively referred to as "ECC bits" or "ECC data"), which are generated by comparing (e.g., XORing) at least a portion of rows (e.g., bit patterns) of encoding matrix (alternatively referred to as a parity matrix) that respectively correspond to bits of data (e.g., data received from the host 103 and/or other auxiliary data generated at the central controller portion 110) having a particular value.

The back end portion 119 can include a media controller and a physical (PHY) layer that couples the memory controller 100 to the memory devices 126. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can include channels 125-1, . . . , 125-N. The channels 125 can include various types of data buses, such as a eight-pin data bus (e.g., data input/output (DQ) bus) and a one-pin data mask inversion (DMI) bus, among other possible buses.

The memory devices 126 can be various/different types of memory devices. For instance, the memory device can include an array RAM, ROM, DRAM, SDRAM, PCRAM, RRAM, and flash memory cells, among others. In embodiments in which the memory device 126 includes persistent or non-volatile memory, the memory device 126 can be flash memory devices such as NAND or NOR flash memory devices. Embodiments are not so limited, however, and the memory device 126 can include an array of other non-volatile memory cells such as non-volatile random-access memory cells (e.g., non-volatile RAM (NVRAM), ReRAM, ferroelectric RAM (FeRAM), MRAM, PCRAM), "emerging" memory cells such as a ferroelectric RAM cells that includes ferroelectric capacitors that can exhibit hysteresis characteristics, a memory device with resistive, phase-change, or similar memory cells, etc., or combinations thereof.

As an example, a FeRAM device (e.g., a memory device 126 include an array of FeRAM cells) can include ferroelectric capacitors and can perform bit storage based on an amount of voltage or charge applied thereto. In such examples, relatively small and relatively large voltages allow the ferroelectric RAM device to exhibit characteristics similar to normal dielectric materials (e.g., dielectric materials that have a relatively high dielectric constant) but at various voltages between such relatively small and large voltages the ferroelectric RAM device can exhibit a polarization reversal that yields non-linear dielectric behavior.

In another example, the memory devices 126 can be a dynamic random access memory (DRAM) device (e.g., the memory device 126 including an array of DRAM cells) operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). In at least one embodiment, at least one of the memory devices 126-1 is operated as an LPDDRx DRAM device with low-power features enabled and at least one of the memory devices 126-N is operated an LPDDRx DRAM device with at least one low-power feature disabled. In some embodiments, although the memory devices 126 are LPDDRx memory devices, the memory devices 126 do not include circuitry configured to provide low-power functionality for the memory devices 126 such as a dynamic voltage frequency scaling core (DVFSC), a sub-threshold current reduce circuit (SCRC), or other low-power functionality providing circuitry. Providing the LPDDRx memory devices 126 without such circuitry can advantageously reduce the cost, size, and/or complexity of the LPDDRx memory devices 126. By way of example, an LPDDRx memory device 126 with reduced low-power functionality providing circuitry can be used for applications other than mobile applications (e.g., if the memory is not intended to be used in a mobile application, some or all low-power functionality may be sacrificed for a reduction in the cost of producing the memory).

Data can be communicated between the back end portion 119 and the memory devices 126 primarily in forms of one or more data blocks. For example, the one or more data blocks can be transferred to/from (e.g., written to/read from) the memory devices 126 via the channels 125 over a predefined burst length (e.g., a 16-bit or 32-bit BL) that the memory controller 100 operates with. As further described herein, a data block can be in a plain text or cypher text form depending on whether the data block has been encrypted at the memory controller 100 (e.g., the security encoder 217-1 illustrated in FIGS. 2A and 2B). The data block can be a unit of read and/or write access to the memory device 126.

Data blocks can include a user data block (UDB). As used herein, the term "UDB" refers to a data block containing host data (e.g., received from the host 103 and alternatively referred to as "user data"). The host data or the parity data of a single UDB can correspond to multiple codewords (e.g., 64 codewords).

A burst is a series of data transfers over multiple cycles, such as beats. As used herein, the term "beat" refers to a clock cycle increment during which an amount of data equal to the width of the memory bus may be transmitted. For example, 32-bit burst length can be made up of 32 beats of data transfers, while 16-bit burst length can be made up of 16 beats of data transfers. Although embodiments are not so limited, a bus width corresponding to a size of each beat can be 8 or 16 (e.g., alternatively referred to as "x8" and "x16", respectively).

Along with the UDB, the data block can also include other "extra" bits of data (e.g., other data in addition to data corresponding to an UDB and alternatively referred to as "auxiliary data") that can also be transferred between the back end portion 119 and the memory devices 126. The extra data can include data used to correct and/or detect errors in UDB and/or at least a portion of auxiliary data, authenticate and/or check data integrity of the UDB and/or metadata, etc. although embodiments are not so limited. In one example, a data block having a size of 70 bytes can include an UDB having a size of 64 bytes as well as 6 bytes of auxiliary data. Further details of the extra bits are illustrated and described in connection with FIGS. 2-6.

In some embodiments, some (e.g., one or more) memory devices 126 can be dedicated for auxiliary data. For example, memory devices configured to store UDBs can be different from a memory device (e.g., one or more memory devices) configured to store auxiliary data.

In some embodiments, the memory controller 100 can include a management unit 105 to initialize, configure, and/or monitor characteristics of the memory controller 100. The management unit 105 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

Figure 2A:
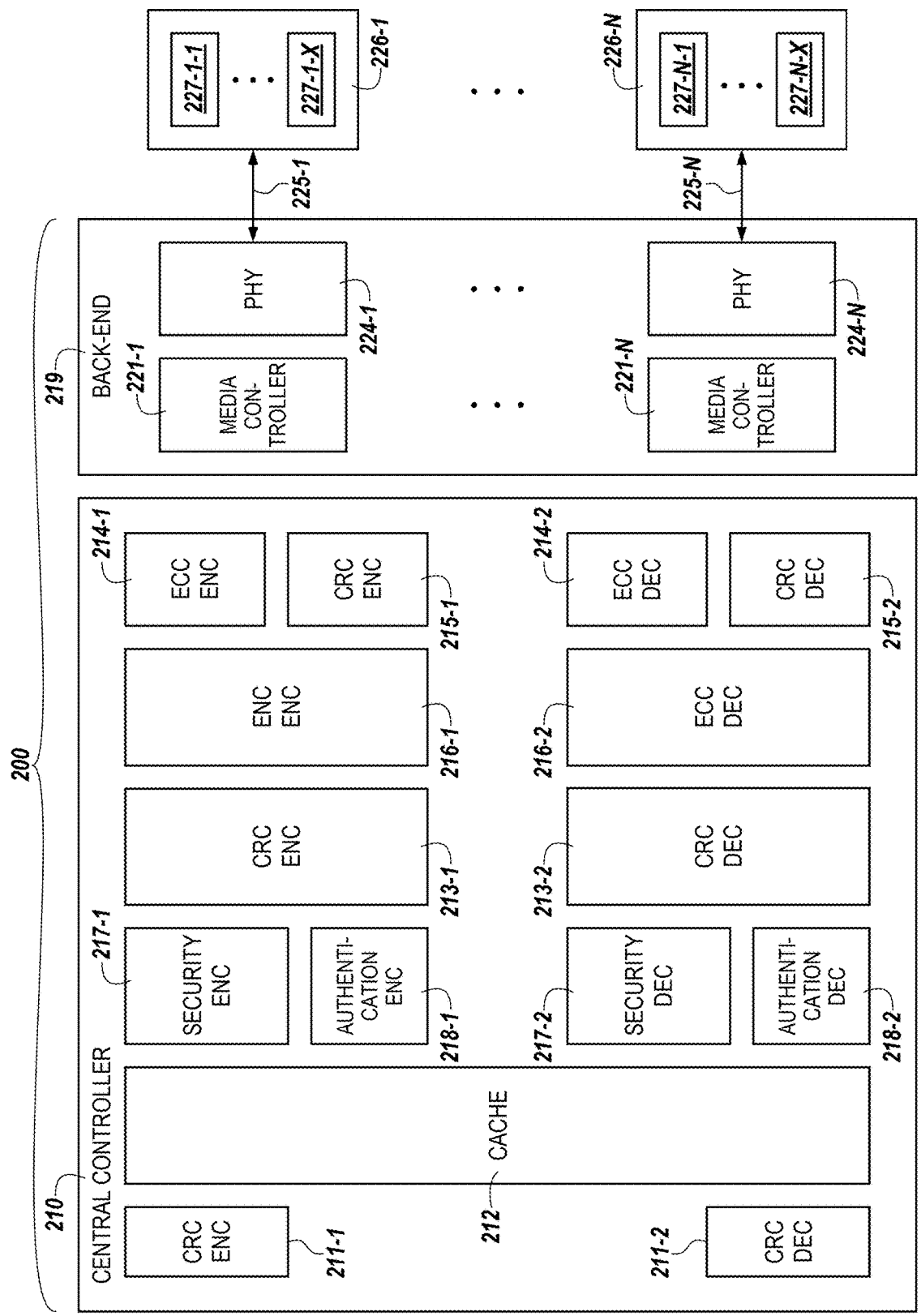
FIG. 2A is a functional block diagram of a memory controller for auxiliary data protection in accordance with a number of embodiments of the present disclosure.

FIG. 2A is a functional block diagram of a memory controller 200 for auxiliary data protection in accordance with a number of embodiments of the present disclosure. The memory controller 200, the central controller portion 210, the back end portion 219, and the memory devices 226 illustrated in FIG. 2A are analogous to the memory controller 100, the central controller portion 210, the back end portion 119, and the memory devices 126 illustrated in FIG. 1.

The central controller portion 210 includes a front-end CRC ("FCRC") encoder 211-1 (e.g., paired with a FCRC decoder 211-2) to generate error detection information (e.g., alternatively referred to as end-to-end CRC (e2e CRC)) based on data (e.g., an UDB in "plain text" form) received as a part of a write command (e.g., received from the host 103) and before writing the data to the cache 212. The error detection information generated at the FCRC encoder 211-1 can be a check value, such as CRC data. Read and write commands of CXL memory systems can be a size of UDB, such as 64 bytes. Accordingly, the data received at the FCRC encoder 211-1 can correspond to a UDB.

The central controller portion 210 includes a cache 212 to store data (e.g., user data), error detection information, error correction information, and/or metadata associated with performance of the memory operation. An example of the cache 212 is a thirty-two (32) way set-associative cache including multiple cache lines. While host read and write commands can be a size of an UDB (e.g., 64 bytes), the cache line size can be greater than a size of an UDB (e.g., equal to a size of multiple UDBs). For example, the cache line size can correspond to a size of 2 UDBs (with each UDB being a 64-byte chunk), such as 128 bytes, although embodiments are not so limited.

These UDBs stored in each cache line (e.g., alternatively referred to as "UDBs corresponding to a cache line") can be a data transfer unit of data paths between the cache 212 and the memory devices 226. For example, even though a host read/write command is a size of an UDB, such as 64 bytes, if a cache line corresponds to multiple UDBs, the UDBs can be collectively transferred between the cache 212 and the memory devices 226 (e.g., through other encoder/decoder illustrated in FIG. 2A) as a chunk. Therefore, the UDBs corresponding to a cache line can be collectively encrypted/decrypted at various encoder/decoders illustrated in FIG. 2A and located between the cache 212 and the memory devices 226. However, embodiments are not so limited and a cache line may correspond to a single UDB instead such that data transfer between the cache 212 and the memory devices 226 can be performed in a unit of a single UDB.

Data (e.g., one or more UDBs) stored in (e.g., a respective cache line of) the cache 212 can be further transferred to the other components (e.g., a security encoder 217-1 and/or an authenticity/integrity check encoder 218-1, which is shown as "AUTHENTICATION ENC" 218-1) of the central controller portion 210 (e.g., as part of cache writing policies, such as cache writeback and/or cache writethrough) to be ultimately stored in the memory devices 226 to synchronizes the cache 212 and the memory devices 226 in the event that the data received from the host (e.g., the host 103 illustrated in FIG. 1) have not been written to the memory devices 226 yet.

Use of the cache 212 to store data associated with a read operation or a write operation can increase a speed and/or efficiency of accessing the data because the cache 212 can prefetch the data and store the data in multiple 64-byte blocks in the case of a cache miss. Instead of searching a separate memory device in the event of a cache miss, the data can be read from the cache 212. Less time and energy may be used accessing the prefetched data than would be used if the memory system has to search for the data before accessing the data.

The central controller portion 210 further includes a security encoder 217-1 (e.g., paired with a security decoder 217-2) to encrypt data (e.g., one or more UDBs corresponding to a cache line) before transferring the data to a ECC encoder 216-1 (to write the data to the memory devices 226). Although embodiments are not so limited, the pair of security encoder/decoder 217 can operate using an AES encryption/decryption (e.g., algorithm). Unencrypted data (e.g., plain text) can be converted to cypher text via encryption by the security encoder 217-1. The central controller portion 210 further includes an authenticity/integrity check encoder 218-1 to generate authentication data based on data received from the cache 212. Although embodiments are not so limited, the authentication data generated at the authenticity/integrity check encoder 218-1 can be MAC, such as KECCAK MAC (KMAC) (e.g., SHA-3-256 MAC).

In some embodiments, the MAC generated at the authenticity/integrity check encoder 218-1 can be calculated based on trusted execution environment (TEE) data (alternatively referred to as "TEE flag"), Host Physical Address (HPA) (e.g., a memory address used/identified by the host 103 illustrated in FIG. 1 in association with host read/write transactions), a security key identifier (ID) that are associated with a physical address (of the memory devices 226) to be accessed for executing a host write command.

The security encoder 217-1 and the authenticity/integrity check encoder 218-1 can operate in parallel. For example, the data stored in the cache 212 and that are in plain text form can be input (e.g., transferred) to both the security encoder 217-1 and the authenticity/integrity check encoder 218-1. In some embodiments, a security key ID can be further input (along with the data in plain text form) to the security encoder 217-1. Further, in some embodiments, a security key ID, TEE flag, and an HPA associated with a host write command can be further input (along with the data in plain text form) to the authenticity/integrity check encoder 218-1.

The central controller portion 210 includes a CRC encoder 213-1 (e.g., paired with a CRC decoder 213-2) to generate error detection information, which is alternatively referred to as CRC media (CRCm), based collectively on one or more UDBs corresponding to a cache line and transferred from the security encoder 217-1. The data transferred and input to the CRC encoder 213-1 can be in cypher text form as the data were previously encrypted at the security encoder 217-1. The error detection information generated at the error detection information generator 213-1 can be a check value, such as CRC data (alternatively referred to as "error detection data"). The CRC encoder 213-1 and CRC decoder 213-2 can operate on data having a size equal to or greater than a cache line size.

As shown in FIG. 2A, the central controller portion 210 further includes an ECC encoders 216-1. The ECC encoder 216-1 can be configured to generate ECC data (alternatively referred to as "error correction data" or "error correction information") based collectively on one or more UDBs corresponding to a cache line as well as authentication data and/or error detection information respectively generated at the authenticity/integrity check encoder 218-1 and CRC encoder 213-1. The ECC data can be later used at a ECC decoder 216-2 to correct multiple bit errors over subsets (of the UDBs corresponding to a cache line) that are to be respectively written to each memory devices 226 and/or dice. In some embodiments, the ECC data can include parity data.

The ECC data generated at the ECC encoder 216-1 can be parity data and the parity data can be used to provide error correction capabilities, such as single symbol correction (SSC), double symbol correction (DSC), double error correction capabilities (DEC), etc., although embodiments are not so limited. As used herein, the term "single symbol correction" or "SSC" refers to a data correction scheme that can correct one symbol (containing one or more bit errors); the term "double symbol correction" or "DSC" refers to a data correction scheme that can correct two symbols (containing one or more bit errors); and the term "double error correction" or "DEC" refers to a data correction scheme that can correct two bit errors (e.g., on a codeword).

As shown in FIG. 2A, the central controller portion 210 further includes a CRC encoder 215-1 and a ECC encoder 214-1 to further provide data protection schemes on those auxiliary data generated at the central controller portion 210. For example, the CRC encoder 215-1 can generate error detection information based on the error correction data generated at the ECC encoder 216-1, error detection data generated at the CRC encoder 213-1, authentication data generated at the authenticity/integrity check encoder 218-1, TEE data, metadata, etc. As used herein, the error detection information can be alternatively referred to as "preliminary error detection information", "preliminary error detection data", or "preliminary CRC data". Further, the ECC encoder 214-1 can generate error correction data based on the error detection information generated at the CRC encoder 215-1, error correction data generated at the ECC encoder 216-1, error detection data generated at the CRC encoder 213-1, authentication data generated at the authenticity/integrity check encoder 218-1, TEE data, metadata, etc. As used herein, the error detection information can be alternatively referred to as "preliminary error correction information", "preliminary error correction data", or "preliminary ECC data". The error detection data and correction data respectively generated at the CRC encoder 215-1 and ECC encoder 214 can be collectively referred to as "preliminary auxiliary data".

The "extra" bits (e.g., auxiliary data) generated at the central controller portion 210 can be transferred (along with the one or more UDBs) to the back end portion 219 to be ultimately transferred and written to the memory devices 226. The "extra" bits can include preliminary error correction data generated at the ECC encoder 214-1, preliminary error detection data generated at the CRC encoder 215-1, CRC data generated at the FCRC encoder 211-1 and/or CRC encoder 213-1, ECC data generated at the ECC encoders 216-1, and/or authentication data (e.g., MAC data) generated at the authenticity/integrity check encoder 218-1 that are associated with the one or more UDBs as well as metadata and/or TEE data.

In one embodiment, the auxiliary data (including at least CRC data, ECC data, and metadata) can be written to a different memory die 227 (alternatively referred to as a "memory unit") than those memory dice 227 to which one or more UDBs are to be written. In a different embodiment, the auxiliary data can be written to the same (e.g., one or more) memory dice 227 as UDBs.

As shown in FIG. 2A, the memory controller 200 can include a back end portion 219 coupled to the central controller portion 210. The back end portion 219 can include media controllers 221-1, . . . , 221-N. The back end portion 219 can include PHY memory interfaces 224-1, . . . , 224-N. Each physical interface 224 is configured to be coupled to a respective memory device 226.

The media controllers 221-1, . . . , 221-N can be used substantially simultaneously to drive the channels 225-1, . . . , 225-N simultaneously. In at least one embodiment, each of the media controllers 221 can receive the same command and address and drive the channels 225 substantially simultaneously. By using the same command and address, each of the media controllers 221 can utilize channels 225 to perform the same memory operation on the same memory cells.

As used herein, the term "substantially" means that the characteristic need not be absolute, but is close enough so as to achieve the advantages of the characteristic. For example, "substantially simultaneously" is not limited to operations that are performed absolutely simultaneously and can include timings that are intended to be contemporaneous but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at exactly the same time. For example, the memory controllers can be utilized such that they are writing data to the memory devices at the same time regardless of whether one of the media controllers commences or terminates prior to the other.

The PHY memory interfaces 224 can be an LPDDRx memory interface. In some embodiments, each of the PHY memory interfaces 224 can include data and DMI pins. For example, each PHY memory interface 224 can include sixteen data pins (DQ pins) and four DMI pins. The media controllers 221 can be configured to exchange data with a respective memory device 226 via the data pins. The media controllers 221 can be configured to exchange error correction information (e.g., ECC data), error detection information, and or metadata via the DMI pins as opposed to exchanging such information via the data pins. The DMI pins can serve multiple functions, such as data mask, data bus inversion, and parity for read operations by setting a mode register. The DMI bus uses a bidirectional signal. In some instances, each transferred byte of data has a corresponding signal sent via the DMI pins for selection of the data. In at least one embodiment, data can be exchanged via DQ pins while data are exchanged via the DMI pins. Therefore, data transfer over DQ pins and DMI pins can be performed substantially simultaneously. Such embodiments reduce what would otherwise be overhead on the data input/output (e.g., also referred to in the art as a "DQ") bus for transferring error correction information, error detection information, and/or metadata.

The back end portion 219 can couple the PHY memory interfaces 224-1, . . . , 224-N to respective memory devices 226-1, . . . , 226-N. The memory devices 226 each include at least one array of memory cells. In some embodiments, the memory devices 226 can be different types of memory. The media controllers 221 can be configured to control at least two different types of memory. For example, the memory device 226-1 can be LPDDRx memory operated according to a first protocol and the memory device 226-N can be LPDDRx memory operated according to a second protocol different from the first protocol. In such an example, the first media controller 221-1 can be configured to control a first subset of the memory devices 226-1 according to the first protocol and the second media controller 221-N can be configured to control a second subset of the memory devices 226-N according to the second protocol.

As illustrated in FIG. 2A, each memory device 226 corresponding to each channel 225 can include one or more memory dice (e.g., two memory dice). For example, a memory device 226-1 includes memory dice 227-1-1, . . . , 227-1-X, while a memory device 226-N includes memory dice 227-1-1, . . . , 227-1-X. Although embodiments are not so limited, at least two memory devices 226 can include different quantities of memory dice.

Data (one or more UDBs corresponding to a cache line) stored in the memory devices 226 can be transferred to the back end portion 219 to be ultimately transferred and written to the cache 212 and/or transferred to the host (e.g., the host 103 illustrated in FIG. 1). In some embodiments, the data are transferred in response to a read command to access a subset of the data (e.g., one UDB) and/or to synchronize the cache 212 and the memory devices 226 to clean up "dirty" data in the cache 212.

Along with the UDBs, other "extra" bits of data (e.g., auxiliary data) can be transferred to the back end portion 219 as well. The "extra" bits can include CRC data generated at the FCRC encoder 211-1 and/or 213-1, ECC data generated at the ECC encoders 216-1, preliminary ECC data generated at the ECC encoder 214-1, preliminary CRC data generated at the CRC encoder 215-1, and authentication data generated at the authenticity/integrity check encoder 218-1 that are associated with the UDBs as well as metadata and/or TEE data. As described herein, the one or more UDBs transferred to the back end portion 219 can be in cypher text form.

The one or more UDBs corresponding to a cache line can be further transferred (e.g., from the back end portion 219) to the ECC decoder 214-2 along with at least the preliminary ECC data previously generated at the ECC encoder 214-1. At the ECC decoder 214-2, an error correction operation (alternatively referred to as "preliminary error correction operation") can be performed on the auxiliary data (e.g., the preliminary CRC data generated at the CRC encoder 215-1, ECC data generated at the ECC encoder 216-1, CRC generated at the CRC encoder 213-1, authentication data generated at the authenticity/integrity check encoder 218-1, TEE data, metadata, etc.) to correct error(s) up to a particular quantity and/or detect errors beyond particular quantity without correcting those. In a particular example, the ECC decoder 216-2 can use the error correction information (e.g., ECC data) to correct a single bit error on data (e.g., auxiliary data), which is referred to as a single error correction (SEC) operation, although embodiments are not so limited.

The one or more UDBs and the auxiliary data can be subsequently input into the CRC decoder 215-1 along with at least the preliminary CRC data previously generated at the CRC encoder 215-1. At the CRC decoder 215-2, an error detection operation (alternatively referred to as "preliminary error detection operation) can be performed for indication of errors in auxiliary data (e.g., ECC data generated at the ECC encoder 216-1, CRC generated at the CRC encoder 213-1, authentication data generated at the authenticity/integrity check encoder 218-1, TEE data, metadata, etc.) using preliminary CRC data. If the preliminary error detection operation indicates no errors in the auxiliary data, the one or more UDBs and the auxiliary data are further processed (e.g., input to the ECC decoder 216-2). Otherwise (e.g., if the preliminary error detection operation indicates errors in the auxiliary data), a "read retry" may be performed to access the UDBs and auxiliary data again such that the UDBs and auxiliary data read again are processed through the ECC decoder 214-2 and CRC decoder 215-2 as mentioned above. Regardless of whether any errors on the UDBs and/or auxiliary data are indicated at the CRC decoder 215-2, the UDBs and auxiliary data can be input to the next level of data protection components (e.g., ECC decoder 216-2, CRC decoder 213-2, etc.) that may correct the errors that were not correctable at the ECC decoder 214-2.

At the ECC decoder 216-2, an error correction operation can be performed to correct an amount of errors in the UDBs (as well as at least a portion of auxiliary data, such as authentication data, metadata, etc.) using the error correction data (e.g., ECC data) previously generated at the ECC encoder 216-1. At the CRC decoder 213-2, an error detection operation can be performed to detect any errors in the UDBs (as well as at least a portion of auxiliary data, such as authentication data, metadata, etc.) using the error detection information (e.g., CRC data) previously generated at the CRC encoder 213-1. If the error detection operation performed here indicates any errors in the UDBs, the UDBs can be marked as being "poisoned", the central controller 210 can notify the host (e.g., the host 103 illustrated in FIG. 1) of the poisoned data.

As described above, an output (e.g., one or more UDBs corresponding to a cache line) from the CRC decoder 213-2 can be further transferred to the security decoder 217-2 and to the authenticity/integrity check decoder 218-2 (shown as "AUTHENTICATION DEC" 218-2 in FIG. 2A) along with at least the authentication data previously generated at the authenticity/integrity check encoder 218-1. At the security decoder 217-2, the data can be decrypted (e.g., converted from the cypher text back to the plain text as originally received from the host). The security decoder 217-2 can use an AES decryption to decrypt the data.

At the authenticity/integrity check decoder 218-2, the data that were decrypted at the security decoder 217-2 can be authenticated (and/or checked for data integrity) using the authentication data (e.g., MAC data) that were previously generated at the authenticity/integrity check encoder 218-1. In some embodiments, the authenticity/integrity check decoder 218-2 can calculate MAC based on TEE data, HPA, and the security key ID associated with a physical address to be accessed for executing a host read command. The MAC that is calculated during the read operation can be compared to the MAC transferred from (a location corresponding to the physical address of) the memory devices 226. If the calculated MAC and transferred MAC match, the UDB is written to the cache 212 (and further transferred to the host if needed). If the calculated MAC and transferred MAC do not match, the host is notified of the mismatch (and/or the poison).

The data (e.g., one or more UDBs corresponding to a cache line) authenticated (and/or checked for data integrity) at the authenticity/integrity check decoder 218-2 can be transferred and written to the cache 212. In some embodiments, data can be further transferred from the cache 212 to the FCRC decoder 211-2, for example, in response to a read command received from the host (e.g., the host 103 illustrated in FIG. 1). As described herein, host read and write commands of CXL memory systems can be a size of UDB, such as 64 bytes. For example, data can be requested by the host in a granularity of an UDB. In this example, even if data transferred from the memory devices 226 are multiple UDBs (corresponding to a cache line), data can be transferred from the cache 212 to the host in a granularity of an UDB. At the FCRC decoder 211-2, data (e.g., an UDB requested by the host) can be checked (CRC-checked) for any errors using CRC data that were previously generated at the FCRC encoder 211-1. The data decrypted at the FCRC decoder 211-2 can be further transferred to the host.

Figure 2B:
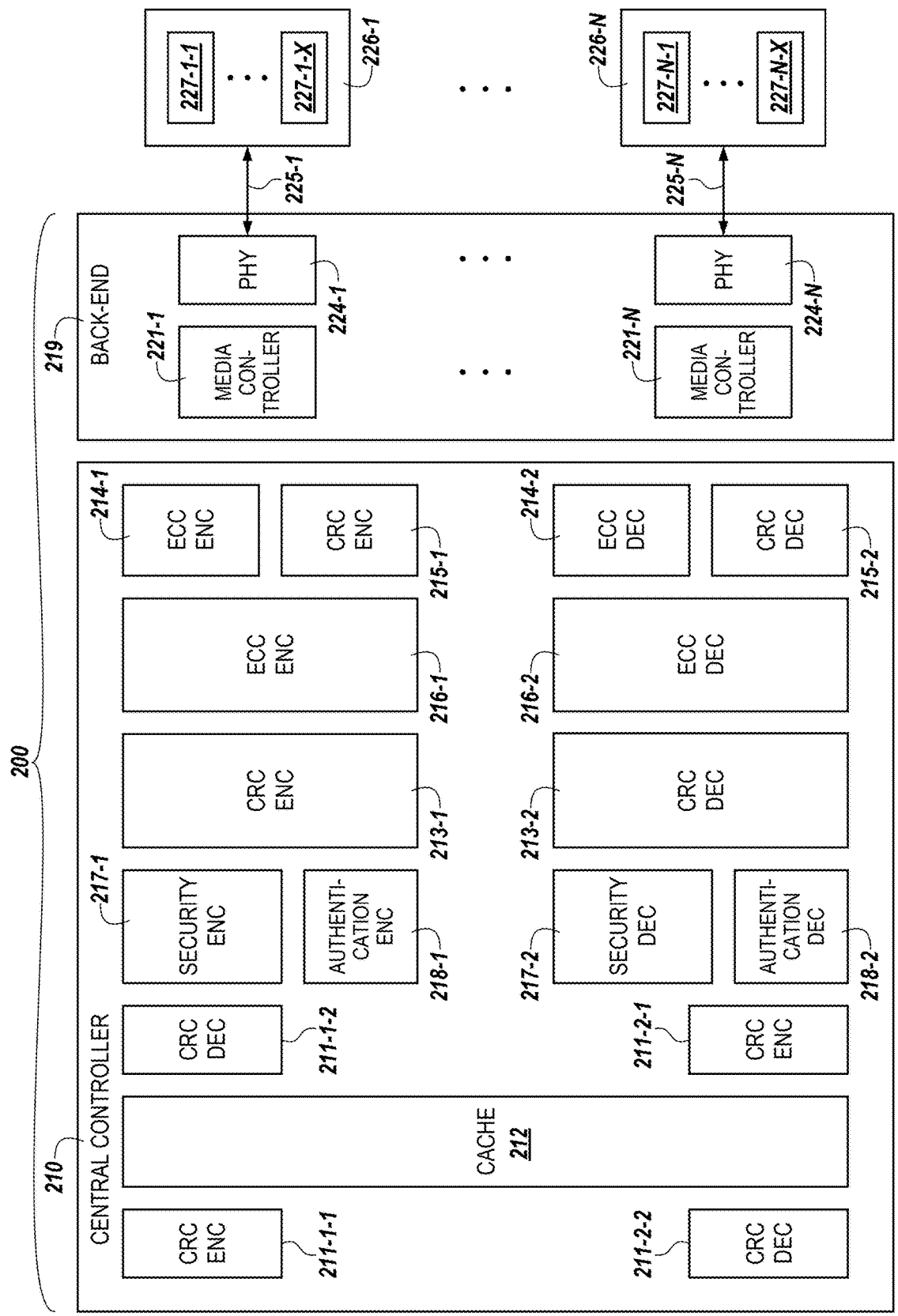
FIG. 2B is another functional block diagram of a memory controller for auxiliary data protection in accordance with a number of embodiments of the present disclosure.

FIG. 2B is another functional block diagram of a memory controller 200 for auxiliary data protection in accordance with a number of embodiments of the present disclosure. The memory controller 200, the central controller portion 210, the back end portion 219, and the memory devices 226 illustrated in FIG. 2B are analogous to the memory controller 100, the central controller portion 110, the back end portion 119, and the memory devices 126 illustrated in FIG. 1.

The memory controller 200 can include a central controller portion 210, and a back end portion 219. The central controller portion 210 can include a front-end CRC ("FCRC") encoder 211-1-1 paired with a FCRC decoder 211-2 and a FCRC encoder 211-2-1 paired with a FCRC decoder 211-2-1, the cache memory 212 coupled between the paired CRC encoder/decoder 211-1 and CRC encoder/decoder 211-2, the security encoder 217-1 paired with the security decoder 217-2, the authenticity/integrity check encoder 218-1 (shown as "AUTHENTICATION ENC" 218-1 in FIG. 2B) paired with the authenticity/integrity check decoder 218-2 (shown as "AUTHENTICATION DEC" 218-2 in FIG. 2B), the CRC encoder 213-1 paired with the CRC decoder 213-2, the ECC encoder 216-1 paired with the ECC decoder 216-2, the CRC encoder 215-1 paired with the CRC decoder 215-2, and the ECC encoder 214-1 paired with the ECC decoder 214-2. A pair of security encoder/decoder 217, a pair of authenticity/integrity check encoder/decoder 218, a pair of CRC encoder/decoder 213, a pair of ECC encoder/decoder 216, a pair of CRC encoder/decoder 215, and a pair of ECC encoder/decoder 214 can be analogous to a pair of security encoder/decoder 217, a pair of authenticity/integrity check encoder/decoder 218, a pair of CRC encoder/decoder 213, a pair of ECC encoder/decoder 216, a pair of CRC encoder/decoder 215, and a pair of ECC encoder/decoder 214 illustrated in FIG. 2A. The back end portion 219 can include media controllers 221-1, . . . , 221-N and PHY memory interfaces 224-1, . . . , 224-N configured to be coupled to memory devices 226-1, . . . , 226-N via channels 225-1, . . . , 225-N.

FIG. 2B is analogous to FIG. 2A, except that it includes additional circuitry to check any errors on the UDB using CRC data without transferring/storing the CRC to the memory device 226. For example, as illustrated in FIG. 2B, the FCRC decoder 211-1-2 coupled between the cache 212 and the security encoder 217-1 (and/or the authenticity/integrity check encoder 218-1) can be configured to check any errors on an UDB stored in the cache 212 using error detection information (e.g., CRC data) generated at the FCRC encoder 211-1-1. The FCRC encoder 211-2-1 coupled between the cache 212 and the security decoder 217-2 (and/or the authenticity/integrity check decoder 218-2) can be configured generate error detection information (e.g., CRC data) on an UDB to be transferred to the host (e.g., the host 103 illustrated in FIG. 1). The error detection information generated at the FCRC encoder 211-2-1 can be used at the FCRC decoder 211-2-2 to check any errors on an UDB transferred from the cache 212.

In some embodiments, the pairs of CRC encoder/decoder 211-1 and 211-2 can be used just to check errors on data stored in the cache. Accordingly, error detection information (e.g., CRC data) used at the pairs 211-1 and 211-2 may not be transferred and written to the memory devices 226.

FIG. 3 illustrates a virtual representation of data alignment and transfer corresponding to a channel in accordance with a number of embodiments of the present disclosure. For example, FIG. 3 illustrates two rows with one row from the memory die 327-1 and another row from the memory die 327-2 that can be virtually represented as a single row. Each row of the memory dice 327-1, 327-2 are partitioned into "column selections" (e.g., column selections "0" to "63" shown on 334 of table 330 illustrated in FIG. 3). Although embodiments are not so limited, the memory dice 327-1 and 3327-2 ("Die 1" and "Die 2" illustrated in FIG. 3) can correspond to (be part of) the same channel, such as channel 125, 225 illustrated in FIGS. 1, 2A, and 2B. Each pair of column sections can be part of a burst length, such as a 32-bit burst length. Alternatively speaking, each column section corresponds to a quantity of bits that can be exchanged with (e.g., transferred out of) the memory dice 327-1, 327-2 over one predefined burst length, such as 32-bit burst length.

As further illustrated in FIG. 3, each 32-bit burst length on 342 of table 330 includes (e.g., consists of data transfer from memory cells corresponding to) column selections (each over 16-bit burst length) shown on 344 of table 330. More particularly, 32-bit burst length "0" (indicated by 332-1 of table 330) includes column selections "0" and "1"; 32-bit burst length "1" (indicated by 332-2 of table 330) includes column selections "2" and "3"; 32-bit burst length "2" (indicated by 332-3 of table 330) includes column selections "4" and "5"; . . . , 32-bit burst length "30" (indicated by 332-31 of table 330) includes column selections "60" and "61"; and 32-bit burst length "31" (indicated by 332-32 of table 330) includes column selections "62" and "63", as illustrated in FIG. 3. As used herein, each pair of column sections 332 that correspond to the 32-bit burst length can be referred to as "column entry".

Each column selection is distributed over different memory dice, such as two memory dice 327-1 and 327-2 ("Die 1" and "Die 2" illustrated in FIG. 3). Accordingly, data transfer corresponding to each pair of column selection includes data transfer from two memory dice. Given that each memory die ("Die 1" or "Die 2") includes 8 DQ pins (as indicated by 336-1 and 336-2) and 2 DMI pins (as indicated by 338-1 and 338-2), the data transfer from a single column selection over the 32-bit burst length via DQ pins can be 64 bytes, while the data transfer over the 32-bit burst length via DMI pins can be 4 bytes. Therefore, data transfer corresponding to the 32-bit burst length can include data transfer of 128 bytes and 8 bytes respectively via DQ pins and DMI pins over the 32-bit burst length.

The row of memory cells illustrated in FIG. 3 includes 31 UDBs with each UDB having a size of 64B. Given that 6 extra data (e.g., auxiliary data) are needed for each UDB, 4 bytes of auxiliary data can be accessed from the same column selection as the respective UDB via DMI pins. Remaining 2 bytes of auxiliary data for each UDB (e.g., 31 data segments with each being 2 byte) can be accessed from a portion of the memory dice 327-1, 327-2 corresponding to the column selection 332-32, as further illustrated in FIGS. 4A and 4B.

Figure 4A:
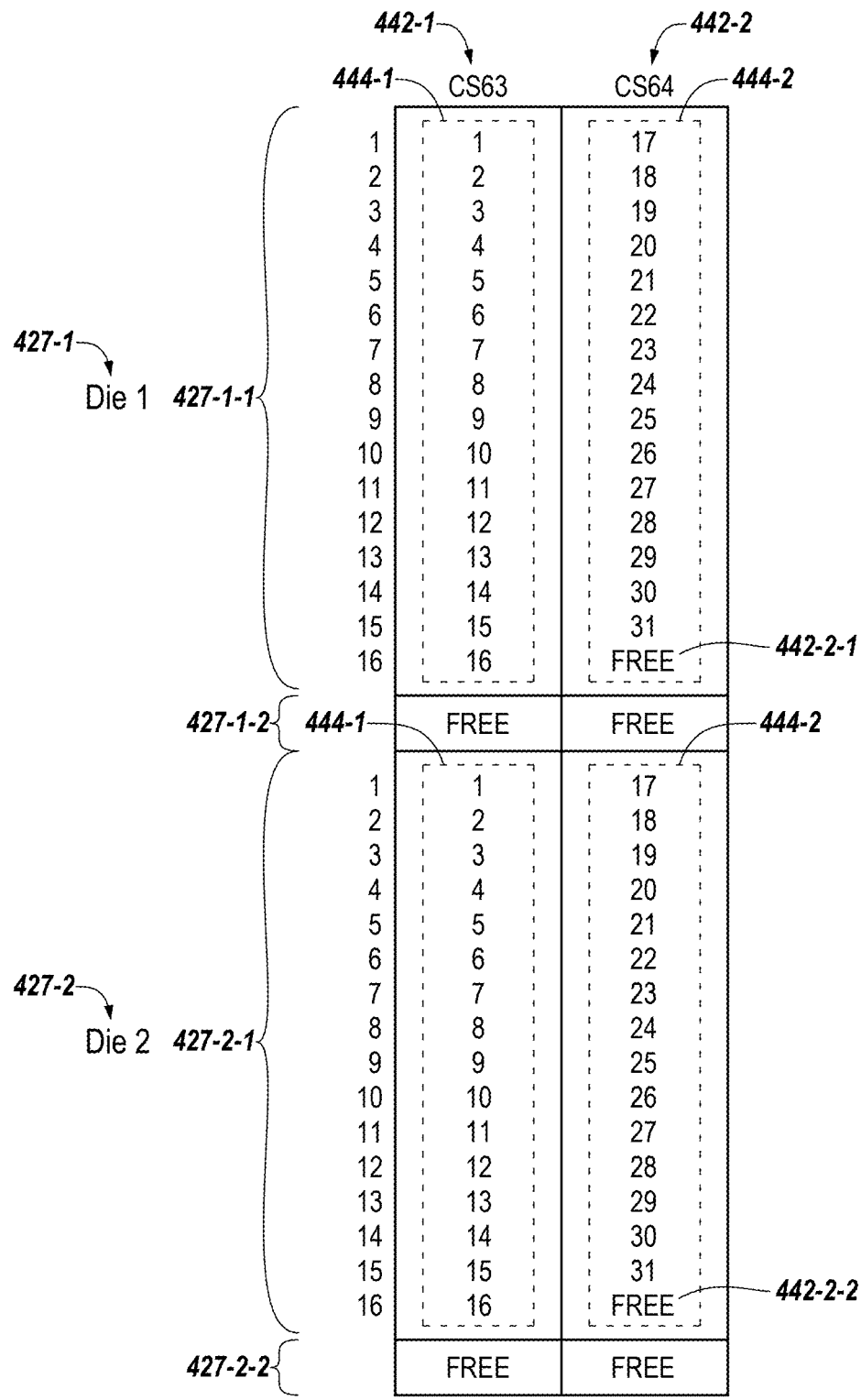
FIG. 4A schematically illustrates an example of data alignment on memory dice in accordance with a number of embodiments of the present disclosure.

FIG. 4A schematically illustrates example data alignment on memory dice 427-1, 427-2 in accordance with a number of embodiments of the present disclosure. Memory dice 427-1, 427-2 are analogous to the memory dice 227 and/or 327 respectively illustrated in FIGS. 2 and 3. The memory dice 427-1 and 427-2 can correspond to and/or be part of the same channel, such as channel 125, 225 illustrated in FIGS. 2 and 3, respectively.

Two column selections 442-1, 442-2 ("CS63" and "CS64" illustrated in FIG. 4A) are respectively analogous to two column selections of the 32-bit burst length "31" on 332 of table 330 illustrated in FIG. 3. As illustrated in FIG. 4A, data transfer to or from each column selection 442-1 includes 16 beats of data transfer to or from the memory die 427-1 via DQ pins (corresponding to 427-1-1) and another 16 beats of data transfer to or from the memory die 427-2 via DQ pins (corresponding to 427-2-1). Further, data transfer to or from each column selection 442-1 can include 8 beats (at the most) of data transfer to or from the memory die 427-1 via DMI pins (corresponding to 427-1-2) and another 8 beats of data transfer to or from the memory die 427-2 via DMI pins (corresponding to 427-2-2).

Similarly, data transfer to or from each column selection 442-2 includes 16 beats of data transfer to or from the memory die 427-1 via DQ pins (corresponding to 427-1-1) and another 16 beats of data transfer to or from the memory die 427-2 via DQ pins (corresponding to 427-2-1). Further, data transfer to or from each column selection 442-2 can include 8 beats (at the most) of data transfer to or from the memory die 427-1 via DMI pins (corresponding to 427-1-2) and another 8 beats of data transfer to or from the memory die 427-2 via DMI pins (corresponding to 427-2-2).

Each beat of the 32-bit burst length can correspond to a quantity of bits that are selectively transferred from a portion of sense amplifiers, which previously sensed bits stored in a row of memory cells. For example, bits transferred from the memory die 427-1 (or memory die 427-2) over 16 beats of the column selection 442-1 can correspond to bits sensed by the sense amplifiers as a result of the row activation. The bits sensed at the sense amplifiers can then be selectively transferred out of the sense amplifiers (e.g., via global I/O lines) 8 bits at a time in each beat of the 32-bit burst length.

The data transfer to or from the memory dice 427-1 and 427-2 can be performed substantially simultaneously. For example, data transfer to or from the memory dice 427-1 and 427-2 that correspond to the column selection 442-1 can be performed during a first portion of the burst length (e.g., first 16 beats of the 32-bit burst length, such as from beat 1 to beat 16), while data transfer to or from the memory dice 427-1 and 427-2 that correspond to the column selection 442-2 can be performed during a second portion of the burst length (e.g., second or subsequent 16 beats of the 32-bit burst length, such as from beat 17 to 32). Considering that two memory dice 427-1 and 427-2 are part of the same channel, such as channel 125, 225 respectively illustrated in FIGS. 1 and 2, the channel width can be 16 bits with each memory die having a beat size of 8.

The auxiliary data can include (non-preliminary) auxiliary data, such as error detection information generated at the CRC encoder 213-1, error correction data generated at the ECC encoder 216-1, authentication data generated at the authenticity/integrity check encoder 218-1, TEE data, metadata, etc. or any combination thereof, that may be accessed along with the one or more UDBs stored in the other column selections of (same rows of) memory dice 427-1, 427-2.

As described herein, the 32-bit burst length "31" (alternatively referred to as column entry "31") with two column selections 442-1, 442-2 corresponding to portions 427-1-1 and 427-2-1 (each and collectively referred to as "DQ portion" or "DQ portions") can be configured to store (e.g., for storing) auxiliary data for one or more data blocks (e.g., UDBs) stored in the other portions of the memory dice 427-1, 427-2 that correspond to different column selections, such as column selections of column entries 332-1, . . . , 332-31 illustrated in FIG. 3. As described above, for example, DQ portions 427-1-1, 427-2-1 of the memory dice 427-1, 427-2 can be configured to store 64 bytes of auxiliary data for 31 UDBs (each having a size of 64 bytes) stored in memory dice 427-1, 427-2 corresponding to the column entries 332-1, . . . , 332-31.

As a result, 3 "free" spaces shown in FIG. 4A can be spared for storing different data. For example, one or more rows of memory cells schematically illustrated in FIG. 4A can be further configured to store data corresponding to another data block that is mainly stored in different row(s) and/or row entry. For example, those portions 442-2-1 (of memory die 427-1) and 442-2-2 (of memory die 427-2) of the column selection 442-2 can be configured to store auxiliary data (e.g., 2 bytes of preliminary auxiliary data) of the data block that is mainly stored in the row entry "32" (e.g., row entry 554 illustrated in FIGS. 5A and 5B).

In the example illustrated in FIG. 4A, each column selection 442 can be respectively configured to store a respective codeword such that two codewords are stored in portions of memory dice 427-1, 427-2 corresponding to column selections 442-1, 442-2. For example, the column selection 442-1 is configured to store a codeword 444-1 and the column selection 442-2 is configured to store a codeword 444-2. As further illustrated in FIG. 4, each codeword (e.g., codeword 444-1 or 444-2) is distributed over the memory dice 427-1 and 427-2.

Each numerical value ("1" to "16" on column selection 442-1 or "17" to "32" on column selection 442-2) on each column selection 442-1, 442-2 illustrated in FIG. 4A corresponds to a respective beat of the burst length. Accordingly, the burst length of the example illustrated in FIG. 4A is a 32-bit burst length. Considering that the size of each beat is "x8", each codeword 444-1 and 444-2 transferred via DQ pins over the 32-bit burst length can be 256 bytes.

In the embodiment illustrated in FIG. 4A, those portions 427-1-2, 427-2-2 (each and collectively referred to as "DMI portion" or "DMI portions") of memory dice 427 corresponding to DMI pins can be configured to store preliminary auxiliary data (e.g., preliminary error correction and detection data respectively generated at the ECC encoder 214-1 and CRC encoder 215-1 of FIGS. 2A and 2B) respectively for codewords 444-1, 444-2. For example, respective portions 427-1-2, 427-2-2 of the memory dice 427 that corresponds to the column selection 442-1 can be configured to store the preliminary auxiliary data for the codeword 444-1, while respective portions 427-1-2, 427-2-2 of the memory dice 427 that corresponds to the column selection 442-2 can be configured to store the preliminary auxiliary data for the codeword 444-2. More particularly, considering that preliminary auxiliary data for each codeword has a size of 2 bytes, a first portion (e.g., 1 byte) of the preliminary auxiliary data for each codeword can be stored in the portion 427-1-2 of the memory die 427-1, while a second portion (e.g., 1 byte) of the preliminary auxiliary data for each codeword can be stored in the portion 427-2-2 of the memory die 427-2.

As described herein, the preliminary auxiliary data provides error protection (e.g., correction and/or detection) capabilities of "payload" portion of codewords (e.g., codeword 444-1 or 444-2), such as data stored on those portions 427-1-1, 427-2-1 of memory dice 427-1, 427-2. Although embodiments are not so limited, the preliminary auxiliary data (e.g., having 2 bytes) for each codeword can be 10 bits of preliminary error correction data and 6 bits of preliminary error detection data. This provides the capability of correcting a single bit error (e.g., SEC) for each codeword through the preliminary error correction data.

Alternatively, the preliminary auxiliary of the codeword 444-2 can be distributed over the DQ portion of the memory die 427-1 on the column selection 442-2, instead of being stored in the DMI portion of the memory die 427-1. For example, a respective one of 16 locations of the DQ portion (of the memory die 427-1) that corresponds to each beat can have 1 bit allocated for storing (configured to store) preliminary auxiliary data of 16 bits (e.g., 10 bits of error correction data generated at the ECC encoder 214-1 and 6 bits of error detection data generated at the CRC encoder 215-1 illustrated in FIGS. 2A and 2B). This can result in reduced size of non-preliminary auxiliary data that has been stored in memory die 427-1 on the column selection 442-2. For example, the memory die 427-1 on the column selection 442-2 would be configured to store 29 bits of error detection data (e.g., previously generated at the CRC encoder 213-1 illustrated in FIGS. 2A and 2B) and 3 bits of metadata in the example, in which the preliminary auxiliary data were not distributed over the DQ portion of the memory die 427-1, but dedicatedly stored in the DMI portion of the memory die 427-1. In contrast, in the example, in which the preliminary auxiliary data are distributed over the DQ portion of the memory die 427-1 as well, the memory die 427-1 on the column selection 442-2 may be configured to store 28 bits (instead of 29 bits) of error detection data (e.g., previously generated at the CRC encoder 213-1 illustrated in FIGS. 2A and 2B) and 3 bits of metadata, which results in one "spare" bit that can be allocated for at least a portion of the preliminary auxiliary data. Since auxiliary data stored in those portions of the memory dice 427-1, 427-2 corresponding to the column selections 442-1, 442-2 correspond to multiple UDBs, each access request (e.g., read and/or write commands) to one UDB can further trigger access to the entire codeword 444-1 and/or 444-2 given that each UDB being a unit of read and write access.

Figure 4B:
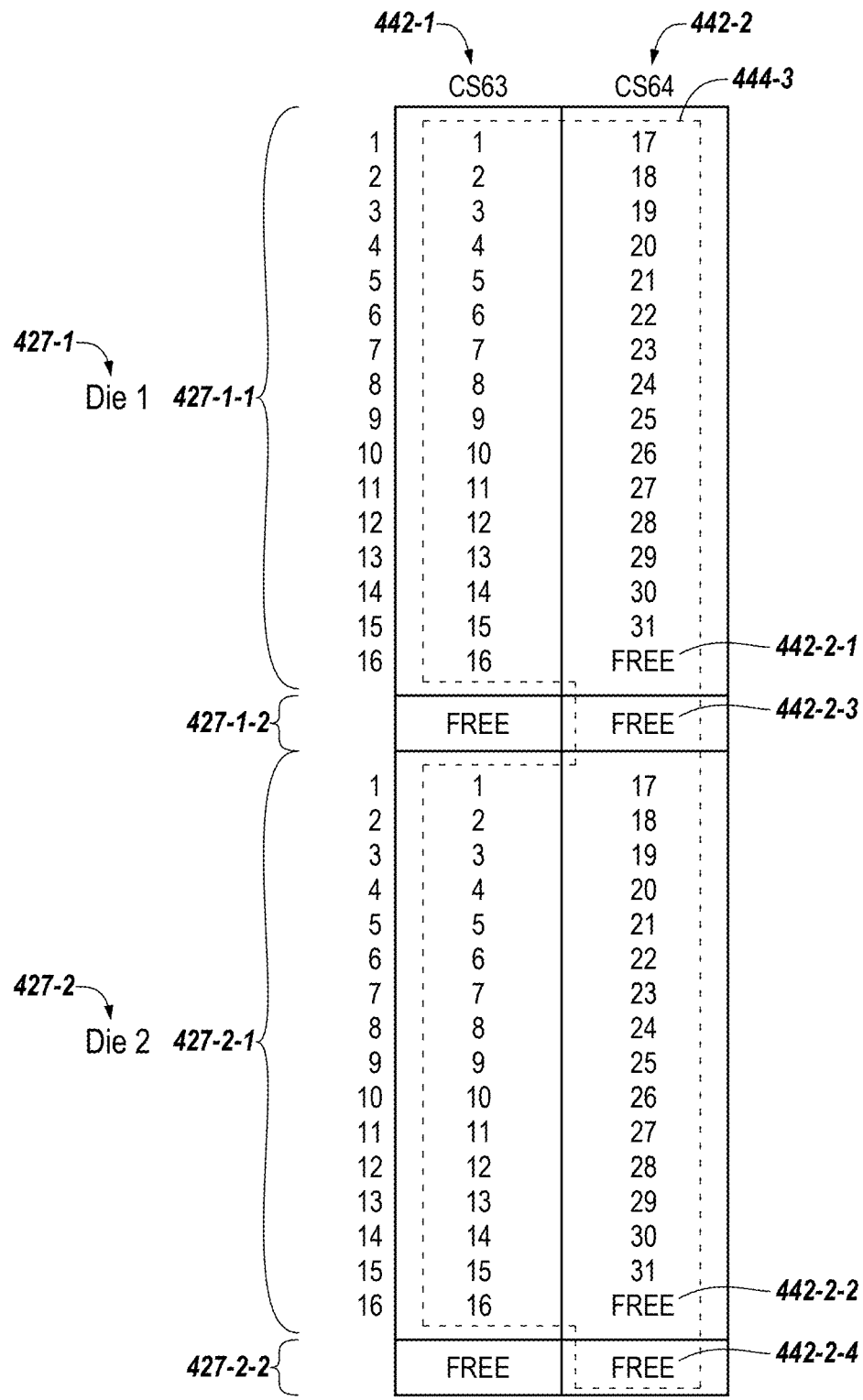
FIG. 4B schematically illustrates another example of data alignment on memory dice in accordance with a number of embodiments of the present disclosure.

FIG. 4B schematically illustrates another example data alignment on memory dice 427-1, 427-2 in accordance with a number of embodiments of the present disclosure. FIG. 4B is analogous to FIG. 4A except that memory dice 427-1 and 427-2 corresponding to column selections 442-1 and 442-2 are configured to store a single codeword 444-3 as compared to two codewords 444-1 and 444-2 illustrated in FIG. 4A. For example, respective portions 427-1-2 and 427-2-2 of the memory dice 427-1 and 427-2 and on the column selection 442-1 can be configured to store preliminary auxiliary data for the codeword 444-3. More particularly, the portion 427-1-2 on the column selection 442-1 can be configured to store 1 byte of preliminary auxiliary data, while the portion 427-2-2 on the column selection 442-1 can be configured to store 1 byte of preliminary auxiliary data. This results in the preliminary auxiliary data being 2 bytes (e.g., 10 bits of error correction data generated at the ECC encoder 214-1 and 6 bits of error detection data generated at the CRC encoder 215-1 illustrated in FIGS. 2A and 2B) for the codeword with its payload portion being 528 bits.

Further, in addition to the portions 442-2-1 and 442-2-2 ("DQ" portions) of the memory dice 427-1 and 427-2 and on the column selection 442-2, respective portions 442-2-3 and 442-2-4 ("DMI" portions) of the memory dice 427-1 and 427-2 and on the column selection 442-2 can also be configured to store auxiliary data (e.g., 2 bytes) of the data block that is mainly stored in the row entry "32" (e.g., row entry 554 illustrated in FIGS. 5A and 5B). This results in 4 bytes of auxiliary data (e.g., 1 byte in each one of the portions 442-2-1, 442-2-2, 442-2-3, 442-2-4) for the data block stored in the row entry "32" as opposed to 2 bytes of auxiliary data as illustrated in FIG. 4A.

FIG. 5A schematically illustrates an example of memory partitioning of one or more memory dice in accordance with a number of embodiments of the present disclosure. For example, table 550 illustrates partitioning of rows of one memory bank that corresponds to a memory die, such as a memory die 427-1 or 427-2 illustrated in FIGS. 4A, 4B, and 4C. Although the table 550 illustrates a particular quantity of rows of memory bank that can be partitioned for (e.g., configured for) particular type of data, embodiments are not limited to a particular "quantity" the memory bank can include and partitioned for.

As indicated by 551 of table 550, the memory bank includes 199,608 rows that can be partitioned into two different row entries. In this example, a first row entry (e.g., a row entry "31" as indicated by 552) include 190,670 rows and a second row entry (e.g., a row entry "32" as indicated by 554) includes 5,958 rows. Although embodiments are not so limited, each row of the row entry "31" can be configured to store 31 UDBs.

As further illustrated in FIG. 5A, 31 the row entry 552 can be partitioned into a first portion ("31A" of 556 as shown in FIG. 5A) having 190,644 rows and a second portion ("31B" of 558 as shown in FIG. 5A) having 6 rows. In a different embodiment (not illustrated in FIG. 5A), the row entry "31A" (indicated by 556) may include 190,624 rows (instead of 190,644 rows), which results in the row entry "31B" (indicated by 558) having 26 rows.

The row entry 552 can be a combination of rows configured in the manner shown in the embodiments illustrated in FIG. 4A and rows configured in the manner shown in the embodiments illustrated in FIG. 4B. For example, those rows configured in the manner shown in the embodiments illustrated in FIG. 4A can each have its column selections "63" and "64" (442-1, 442-2 illustrated in FIG. 4A) respectively storing two different codewords (e.g., the codewords 444-1, 444-2 illustrated in FIG. 4A) with the column selection "64" (442-2 illustrated in FIG. 4A) configured to store (e.g., 2 byte of) auxiliary data for one or more data blocks stored in the row entry "32" (e.g., row entry 554 illustrated in FIGS. 5A and 5B). Further, those rows configured in the manner shown in the embodiments illustrated in FIG. 4B can each have its column selections "63" and "64" (442-1, 442-2 illustrated in FIG. 4B) storing a single codeword (e.g., the codeword 444-3 illustrated in FIG. 4B) with the column selection "64" (442-2 illustrated in FIG. 4B) configured to store (e.g., 4 bytes of) auxiliary data for one or more data blocks stored in the row entry "32" (e.g., row entry 554 illustrated in FIGS. 5A and 5B).

As further illustrated in FIG. 5A, the row entry "32" can be partitioned into a first portion ("32A" of 560 as shown in FIG. 5A) having 5,957 rows and a second portion ("32B" of 562 as shown in FIG. 5A) having 1 row. The single row of "32B" is further partitioned into a first portion (e.g., "32B4" including 12 column entries as indicated by 564) and a second portion (e.g., "32B2" including 20 column entries as indicated by 566).

If auxiliary data are stored in rows and/or column entries corresponding to "31B" (indicated by 558) or "32B4" (indicated by 564), the "second access" for accessing the auxiliary data can be performed in a subsequent portion of the predefined burst length, such as in 17 to 32 beats of a 32-bit burst length. Otherwise, the "second access" for accessing the auxiliary data stored in the other portions of the bank shown in FIG. 5A can be performed in the (e.g., shortened) predefined burst length, such as a 16-bit burst length.

FIG. 5B schematically illustrates another example memory partitioning of one or more memory dice in accordance with a number of embodiments of the present disclosure. For example, table 570 illustrates partitioning of rows of one memory bank that corresponds to a memory die, such as memory die 427-1 or 427-2 illustrated in FIGS. 4A, 4B, and 4C. Although the table 570 illustrates a particular quantity of rows of memory bank that can be partitioned for (e.g., configured for) particular type of data, embodiments are not limited to a particular "quantity" the memory bank can include and partitioned for.

FIG. 5B is generally analogous to FIG. 5A except that "spare rows" of the memory bank are further utilized as part of the partitioning illustrated in FIG. 5B. For example, as indicated by 571 of table 570, the memory bank includes 199,608 rows that can be partitioned into two row entries (as indicated by 572 and 572) as well as 16 spare rows (as indicated by 573). In this example, a first row entry (e.g., the row entry "31" as indicated by 572) includes 190,138 rows and a second row entry (e.g., the row entry "32" as indicated by 574) includes 6,454 rows.

As further illustrated in FIG. 5B, the row entry 572 can be partitioned into a first portion ("31A" of 576 as shown in FIG. 5B) having 173,748 rows and a second portion ("31B" of 578 as shown in FIG. 5B) having 16,390 rows. The row entry 572 can be a combination of rows configured in the manner shown in the embodiments illustrated in FIG. 4A and rows configured in the manner shown in the embodiments illustrated in FIG. 4B.

As further illustrated in FIG. 5B, the row entry "32" can be partitioned into a first portion ("32A" of 580 as shown in FIG. 5B) having 5,429 rows, a second portion ("32B" of 582 as shown in FIG. 5B) having 1,024 row, and a third portion ("32AB" of 583 as shown in FIG. 5B) having 1 row. The single row of "32AB" is further partitioned into a first portion (e.g., "32B4" including 12 column entries as indicated by 584) and a second portion (e.g., "32B2" including 20 column entries as indicated by 586).

If auxiliary data are stored in rows and/or column entries corresponding to "31B" (indicated by 558), "32B" (indicated by 582), or "B" (indicated by 584), the "second access" for accessing the auxiliary data can be performed in a subsequent portion of the predefined burst length, such as in 17 to 32 beats of a 32-bit burst length. Otherwise, the "second access" for accessing the auxiliary data stored in the other portions of the bank shown in FIG. 5B can be performed in the (e.g., shortened) predefined burst length, such as a 16-bit burst length.

Figure 6:
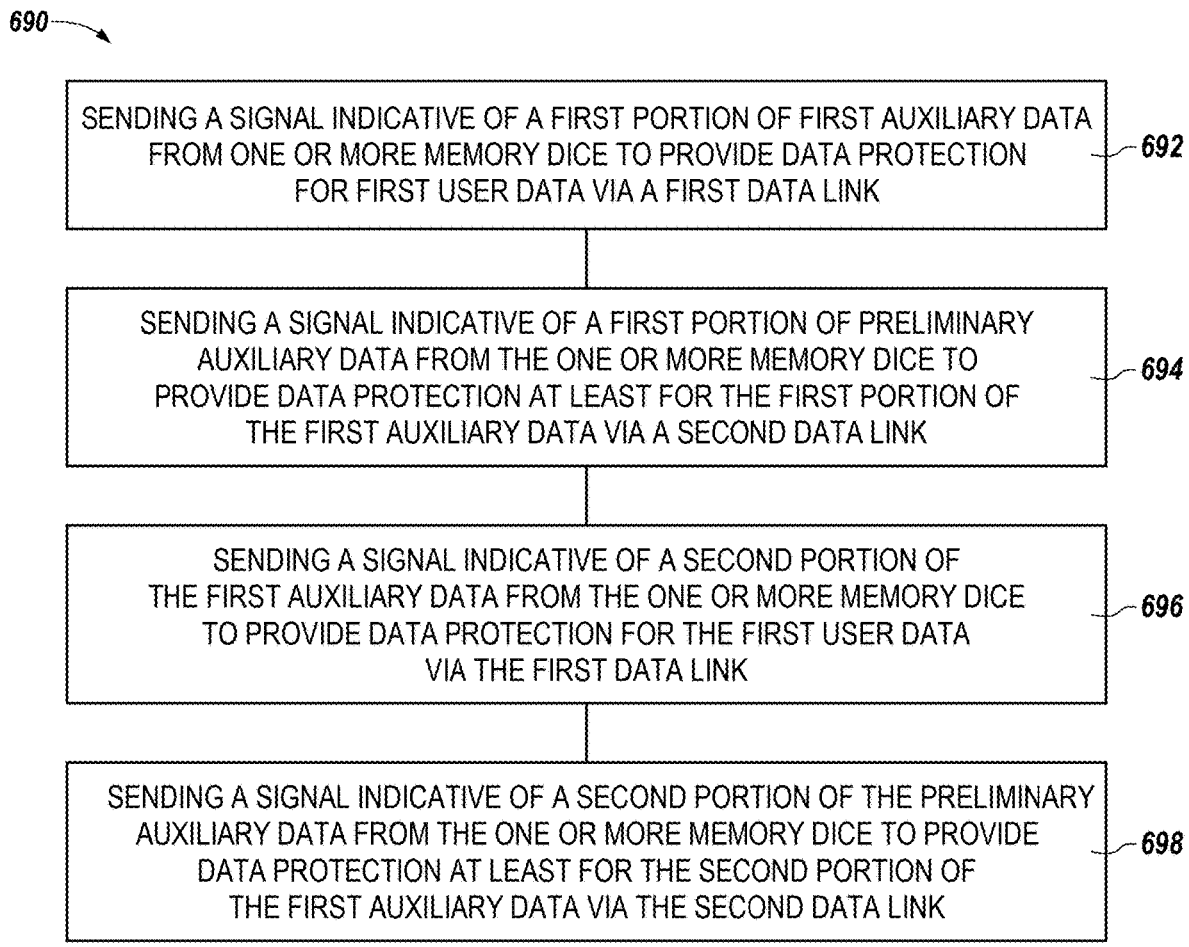
FIG. 6 is a flow diagram corresponding to a method for distributing and providing data protection for auxiliary data in accordance with a number of embodiments of the present disclosure.

FIG. 6 is a flow diagram corresponding to a method 690 for distributing and providing data protection for auxiliary data in accordance with a number of embodiments of the present disclosure. The method 690 can be performed by processing logic (e.g., the controller 100, 200 illustrated in FIGS. 1-2, respectively) or one or more memory dice (e.g., the memory dice 127, 227, 327, 427 illustrated in FIGS. 1-4, respectively) that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 692, the method 690 includes sending a signal indicative of a first portion of first auxiliary data from one or more memory dice (e.g., the memory dice 127, 227, 327, 427 illustrated in FIGS. 1-4, respectively and corresponding to the same channel 125, 225 illustrated in FIGS. 1-2, respectively) to provide data protection for first user data (e.g., one or more UDBs stored in column entries 332-1, . . . , 332-31 illustrated in FIG. 3) via a first data link (e.g., data bus including DQ pins, such as 16 DQ pins coupled to the portions 427-1-1 and 427-2-1 of the memory dice 427-1, 427-2) during a first portion of one or more first predefined burst lengths (e.g., 16-bit burst length or beats 1 to 16 of 32-bit burst length). As used herein, the term "data link" refers to a data path including one or more than one physical connection. In one example, a data link can be made up of a respective quantity of data lines (DQs), which are also referred to as DQ pins or pads. In another example, a data link can be made up of a respective quantity of DMI lines, which are also referred to as DMI pins or pads.

At 694, the method 690 further includes sending a signal indicative of a first portion of preliminary auxiliary data (e.g., ECC and/or CRC data respectively generated at the ECC encoder 214-1 and CRC encoder 215-1 illustrated in FIGS. 1-2, respectively) from the one or more memory dice 127, 227, 327, 427 to provide data protection at least for the first portion of the first auxiliary data via a second data link (e.g., data bus including DMI pins, such as 4 DMI pins coupled to the portions 427-1-2 and 427-2-2 of the memory dice 427-1, 427-2) during the first portion of the one or more first predefined burst lengths (e.g., 16-bit burst length or 32-bit burst length).

At 696, the method 690 further includes sending a signal indicative of a second portion of the first auxiliary data from the one or more memory dice 127, 227, 327, 427 to provide data protection for the first user data via the first data link during a second portion of the one or more first predefined burst lengths (e.g., another 16-bit burst length or beats 17 to 32 of 32-bit burst length). At 698, the method 690 further includes sending a signal indicative of a second portion of the preliminary auxiliary data from the one or more memory dice to provide data protection at least for the second portion of the first auxiliary data via the second data link during the second portion of the one or more first predefined burst lengths.

In some embodiments, a signal indicative of at least a portion of second auxiliary data can be sent from the one or more memory dice 127, 227, 327, 427 during the second portion of the one or more first predefined burst lengths to provide data protection for second user data via the first data link. The second user data can be stored in a different group of rows of memory cells (e.g., one or more rows of the row entry "32" illustrated in FIGS. 5A and 5B) than a group of rows of memory cells (e.g., one or more rows of the row entry "31" illustrated in FIGS. 5A and 5B) configured to store the first user data. In this example, a signal indicative of a remaining portion of the second auxiliary data via the second data link can be also sent from the one or more memory dice 127, 227, 327, 427 during the second portion of the one or more first predefined burst lengths.

In some embodiments, the first auxiliary data and the first portion of preliminary auxiliary data can be part of a first codeword (e.g., the codeword 444-1 illustrated in FIG. 4A) and can be sent during one predefined burst length (e.g., 16-bit burst length) of the one or more first predefined burst lengths. Further, the second portion of the first auxiliary data and the second portion of the preliminary auxiliary data can be part of a second codeword (e.g., the codeword 444-2 illustrated in FIG. 4A) and can be sent during another predefined burst length (e.g., another 16-bit burst length) of the one or more first predefined burst lengths.

In some embodiments, the first and second portions of the first auxiliary data as well as the first and second portions of preliminary auxiliary data can be part of the same codeword (e.g., the codeword 444-3 illustrated in FIG. 4B). In this example, (e.g., a signal indicative of) the first portion of the first auxiliary data and the first portion of preliminary auxiliary data can be sent during a first portion of the first predefined burst length (e.g., during beats 1 to 16 of the 32-bit burst length). Further, (e.g., a signal indicative of) the second portion of the first auxiliary data and the second portion of the preliminary auxiliary data during a second portion of the first predefined burst length (e.g., during beats 17 to 32 of the 32-bit burst length).

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
during a first portion of one or more first predefined burst lengths:
sending a signal indicative of a first portion of first auxiliary data from one or more memory dice to provide data protection for first user data via a first data link; and
sending a signal indicative of a first portion of preliminary auxiliary data from the one or more memory dice to provide data protection at least for the first portion of the first auxiliary data via a second data link; and
during a second portion of the one or more first predefined burst lengths:
sending a signal indicative of a second portion of the first auxiliary data from the one or more memory dice to provide data protection for the first user data via the first data link; and
sending a signal indicative of a second portion of the preliminary auxiliary data from the one or more memory dice to provide data protection at least for the second portion of the first auxiliary data via the second data link.

2. The method of claim 1, further comprising, during the second portion of the one or more first predefined burst lengths:
sending a signal indicative of at least a portion of second auxiliary data from the one or more memory dice to provide data protection for second user data via the first data link, wherein the second user data is stored in a different group of rows of memory cells than a group of rows of memory cells configured to store the first user data.

3. The method of claim 2, further comprising, during the second portion of the one or more first predefined burst lengths:
sending a signal indicative of a remaining portion of the second auxiliary data from the one or more memory dice via the second data link.

4. The method of claim 1, further comprising:
sending the signal indicative of a first codeword comprising the first portion of the first auxiliary data and the first portion of preliminary auxiliary data during one predefined burst length of the one or more first predefined burst lengths; and
sending the signal indicative of a second codeword comprising the second portion of the first auxiliary data and the second portion of the preliminary auxiliary data during another predefined burst length of the one or more first predefined burst lengths.

5. The method of claim 1, further comprising:
sending the signal indicative of a first codeword comprising the first portion of the first auxiliary data and the first portion of preliminary auxiliary data during a first portion of the first predefined burst length; and
sending the signal indicative of the first codeword comprising the second portion of the first auxiliary data and the second portion of the preliminary auxiliary data during a second portion of the first predefined burst length.

6. An apparatus, comprising:
a first number of rows of memory cells of a memory array, a respective row of memory cells of the first number of rows configured to store:
first user data;
first auxiliary data corresponding to the first user data; and
a first portion of second auxiliary data corresponding to second user data; and
a second number of rows of memory cells of the memory array, a respective row of memory cells of the second number of rows configured to store:
the second user data; and
a second portion of the second auxiliary data corresponding to the second user data.

7. The apparatus of claim 6, wherein:
the first number of rows of memory cells are partitioned into a plurality of column selections;
a first number of column selections of the plurality configured to store the first user data; and
a second number of column selections of the plurality is configured to store the first auxiliary data and the second auxiliary data.

8. The apparatus of claim 7, wherein the second number of column selections is further configured to store preliminary auxiliary data corresponding to the first auxiliary data and the second auxiliary data.

9. The apparatus of claim 8, wherein the preliminary auxiliary data is to provide data protection capability for the first auxiliary data and the second auxiliary data.

10. The apparatus of claim 8, wherein each column selection of the second number of column selections further comprises:
a first portion of the respective column selection configured to exchange respective data via a number of data input/output (DQ) pins;
a second portion of the respective column selection configured to exchange respective data via a number of data mask inversion (DMI).

11. The apparatus of claim 10, wherein:
the first portion of the respective column selection is configured to store the first auxiliary data, the second auxiliary data, or any combination thereof; and
the second portion of the respective column selection is configured to store the preliminary auxiliary data.

12. The apparatus of claim 8, wherein:
a first column selection of the second number of column selections is configured to store a first codeword comprising the first auxiliary data and a first portion of the preliminary auxiliary data, wherein the first portion of the preliminary auxiliary data is to provide data protection for the first auxiliary data; and
a second column selection of the second number of column selections is configured to store a second codeword comprising the second auxiliary data and a second portion of the preliminary auxiliary data, wherein the second portion of the preliminary auxiliary data is to provide data protection for the second auxiliary data.

13. The apparatus of claim 8, wherein the second number of column selections is configured to store a first codeword comprising the first and second auxiliary data and the preliminary auxiliary data, wherein the preliminary auxiliary data is to provide data protection for first and second auxiliary data collectively.

14. The apparatus of claim 7, wherein each column selection is configured to exchange data over at least a portion of a predefined burst length.

15. An apparatus, comprising:
one or more memory dice, the one or more memory dice configured to, during a first portion of one or more predefined burst lengths:
exchange a signal indicative of first auxiliary data via a first data link, wherein the first auxiliary data is to provide data protection for first user data; and
exchange a signal indicative of a first portion of preliminary auxiliary data via a second data link, wherein the preliminary auxiliary data is to provide data protection at least for the first auxiliary data; and
the one or more memory dice further configured to, during a second portion of the one or more predefined burst lengths:
exchange a signal indicative of second auxiliary data via the first data link, wherein the second auxiliary data is to provide data protection for the first user data; and
exchange a signal indicative of a second portion of the preliminary auxiliary data from the one or more memory dice via the second data link, wherein the second portion of the preliminary auxiliary data is to provide data protection at least for the second auxiliary data.

16. The apparatus of claim 15, further comprising a controller coupled to the one or more memory dice, the controller configured to:
perform an error correction operation on the first auxiliary data or the second auxiliary data using the first portion or second portion of the preliminary auxiliary data respectively; and
perform an error detection operation on the first auxiliary data or the second auxiliary data using the first portion or the second portion of the preliminary auxiliary data respectively.

17. The apparatus of claim 16, wherein the controller is further configured to:
responsive to the error detection operation performed on the first auxiliary data or the second auxiliary data not indicating one or more errors, perform an error correction operation and an error detection operation on the first user data using the first auxiliary data and the second auxiliary data; and
responsive to the error detection operation performed on the first auxiliary data or the second auxiliary data indicating one or more errors:
access the one or more memory dice to read the first auxiliary data or the second auxiliary data and the preliminary auxiliary data again to cause another error correction or detection operation performed on the first auxiliary data or the second auxiliary data using the first portion or the second portion of the preliminary auxiliary data.

18. The apparatus of claim 15, wherein:
the first data link comprises one or more data input/output (DQ) pins; and
the second data link comprises one or more data mask inversion (DMI) pins.

19. The apparatus of claim 15, wherein the one or more memory dice is further configured to, during the first portion or the second portion of the one or more predefined burst lengths:
exchange a signal indicative of a third portion of the preliminary auxiliary data via the first data link along with the signal indicative of the first auxiliary data or the second auxiliary data.

20. The apparatus of claim 15, wherein the first auxiliary data, the second auxiliary data, the preliminary auxiliary data, or any combination thereof, comprises parity data, cyclic redundancy check (CRC) information, or any combination thereof.

* * * * *